*2,875,835*
Patented Mar. 3, 1959

2,875,835
HIGH TEMPERATURE CEMENT

Thomas E. Watkins, Arlington, and William R. Foster, Dallas, Tex., assignors, by mesne assignments, to Socony Mobil Oil Company, Inc., a corporation of New York No Drawing. Application March 12, 1954
Serial No. 415,952

10 Claims. (Cl. 166—31)

This invention relates to cement and relates more particularly to cement for use in high temperature wells.

Commonly, casing is secured in place in wells, such as petroleum oil or gas wells, by cementing. The cement is forced by pumping from the surface of the ground through tubing to the bottom of the well and from the tubing upwardly between the casing and the walls of the well. After the cement has been pumped between the casing and the walls of the well, pumping is discontinued and the cement is permitted to set in place. Cementing is also often employed to close off a porous formation within a well to prevent loss of fluid into the formation. Cementing procedures are also employed for various other purposes in a well. Ordinarily, in cementing procedures in a well, Portland cement is employed.

While Portland cement is satisfactory for use in wells where moderate temperatures are encountered, it is generally unsatisfactory for use in wells where temperatures in excess of about 250° F. are encountered. At temperatures in excess of about 250° F., Portland cement sets rapidly and setting can occur before the cement can be pumped into place in the well. With greater depths, greater times are required to pump the cement from the surface of the earth to the desired location in the well, not only because of the greater distance of travel but also because of the generally decreased diameter of tubing and, where casing is being cemented, the generally decreased annular clearance between the casing and the walls of the well. Thus, since well temperatures increase with depth, the difficulty of premature setting becomes aggravated in proportion to the depth of the well. A measure of improvement is obtained by employing additives in the cement which retard the setting time and thus increase the pumping time. Nevertheless, the cementing of high temperature wells remains a difficult problem from the standpoint of pumping time.

It is an object of this invention to provide a method for cementing high temperature wells. It is another object of this invention to provide a cement for use in high temperature wells. It is another object of this invention to increase pumping times in the cementing of a well. It is another object of this invention to provide a cement having improved setting characteristics at high temperatures. Further objects of the invention will become apparent from the following detailed description.

In accordance with the invention, there is provided a cement comprising water, lime, quartz, clay, and an organic additive for retarding setting time. The cement contains at mixing between about 45 and 55 percent by weight of water. The solids content of the cement comprises between about 35 and 65 percent by weight of lime, between about 10 and 30 percent by weight of quartz, between about 10 and 30 percent by weight of clay, and between about 6 and 14 percent by weight of organic additive for retarding setting time. Suitably, the cement contains at mixing between about 47 and 53 percent by weight of water and the solids content comprises between about 40 and 60 percent by weight of lime, between about 15 and 25 percent by weight of quartz, between about 15 and 25 percent by weight of clay, and between about 8 and 12 percent by weight of organic additive for retarding setting time. In a preferred embodiment, the cement contains at mixing about 50 percent by weight of water and the solids content comprises about 50 percent by weight of lime, about 20 percent by weight of quartz, about 20 percent by weight of clay, and about 10 percent by weight of organic additive for retarding setting time.

The cement of the invention has a long pumping time even at high temperatures. In the cementing of high temperature wells, pumping times of the order of six to twelve hours, and longer, depending upon the particular temperature of the well may be obtained. Thus, in deep wells and in others wherein the temperature is in excess of 250° F., a suitably long pumping time prior to setting of cement can be obtained.

By lime we mean calcium hydroxide. By quartz we mean silicon dioxide. Preferably the silicon dioxide is in a state of subdivision such that it will pass through at least a 160 mesh screen (U. S. Sieve Series). The clay may be any hydrous silicate of aluminum such as bentonite or other montmorillonite, kaolinite, attapulgite, zeolite, etc. The organic additive for retarding setting time may be any of those employed in Portland and other types of conventional cements for retarding setting time. Included among these additives are water soluble phenol-formaldehyde resins, casein-formaldehyde resins, urea-formaldehyde resins, degradation products of casein including amino acids such as glycine, natural gums such as gum arabic, gum karaya, gum ghatti, and others.

The following examples will be illustrative of our invention. In each of the examples, the cement was tested in a high pressure, high temperature consistometer for pumping time, i. e., the time it would remain pumpable. In the consistometer, conditions simulating the pumping of a cement into a well bore hole are reproduced and the conditions can be varied to represent pumping of cement at various pressures and at various temperatures. In accordance with API Cementing Practice Code No. 32, a cement is regarded as being pumpable until its viscosity, under the pressure and temperatures employed for the particular pumping schedule, which schedules are set out in the code, exceeds 100 poises. This time is known as the pumping time. Further, in accordance with the code, a cement is regarded as being satisfactory with respect to compressive strength if its compressive strength is at least 500 pounds per square inch after setting for 22 hours at 300° F. In each example, the compressive strength of the cement was determined following setting for 22 hours at 300° F.

Example 1

In this example, a cement having the composition indicated below was prepared.

| Material | Amount |
|---|---|
| Water | 50.0 percent by weight of cement. |
| Lime | 55.1 percent by weight of solids. |
| Quartz | 18.4 percent by weight of solids. |
| Kaolinite | 18.4 percent by weight of solids. |
| Phenol-formaldehyde resin | 8.1 percent by weight of solids. |

This cement remained pumpable for 160 minutes and had a compressive strength of 555 pounds per square inch.

Example 2

In this example, a cement was prepared having the following composition.

| Material | Amount |
| --- | --- |
| Water | 47.0 percent by weight of cement. |
| Lime | 48.0 percent by weight of solids. |
| Quartz | 16.0 percent by weight of solids. |
| Kaolinite | 16.0 percent by weight of solids. |
| Urea-formaldehyde resin | 20.0 percent by weight of solids. |

This cement had a pumping time of 272 minutes and a compressive strength of 812 pounds per square inch.

Example 3

A cement was prepared having the following composition.

| Material | Amount |
| --- | --- |
| Water | 50.0 percent by weight of cement. |
| Lime | 51.0 percent by weight of solids. |
| Quartz | 17.0 percent by weight of solids. |
| Kaolinite | 17.0 percent by weight of solids. |
| Phenol-formaldehyde resin | 15.0 percent by weight of solids. |

The pumping time of this cement was 218 minutes and the compressive strength was 930 pounds per square inch.

Example 4

A cement was prepared having the following composition.

| Material | Amount |
| --- | --- |
| Water | 47.0 percent by weight of cement. |
| Lime | 54.0 percent by weight of solids. |
| Quartz | 18.0 percent by weight of solids. |
| Kaolinite | 18.0 percent by weight of solids. |
| Urea-formaldehyde resin | 10.0 percent by weight of solids. |

The pumping time of this cement was 134 minutes and its compressive strength was 1000 pounds per square inch.

Example 5

In this example, the composition of the cement was as given below.

| Material | Amount |
| --- | --- |
| Water | 47.0 percent by weight of cement. |
| Lime | 51.0 percent by weight of solids. |
| Quartz | 17.0 percent by weight of soilds |
| Kaolinite | 17.0 percent by weight of solids. |
| Urea-formaldehyde resin | 15.0 percent by weight of solids. |

The pumping time of this cement was 170 minutes and its compressive strength was 1170 pounds per square inch.

Example 6

In this example, a cement having the following composition was prepared.

| Material | Amount |
| --- | --- |
| Water | 51.0 percent by weight of cement. |
| Lime | 55.0 percent by weight of solids. |
| Quartz | 18.3 percent by weight of solids. |
| Kaolinite | 18.3 percent by weight of solids. |
| Urea-formaldehyde resin | 8.4 percent by weight of solids. |

The pumping time of this cement was 115 minutes and its compressive strength was 1430 pounds per square inch.

Having thus described our invention, it will be understood that such description has been given by way of illustration and example and not by way of limitation, reference for the latter purpose being had to the appended claims.

We claim:

1. A method of cementing a well comprising pumping into said well cement consisting essentially of water, lime, quartz, clay, and an organic additive for retarding setting time, the cement containing between about 47 and 53 percent by weight of water and the solids content of the cement consisting essentially of between about 40 and 60 percent by weight of lime, between about 15 and 25 percent by weight of quartz, between about 15 and 25 percent by weight of clay, and between about 8 and 12 percent by weight of organic additive for retarding setting time.

2. A method of cementing a well comprising pumping into said well cement consisting essentially of water, lime, quartz, clay, and an organic additive for retarding setting time, the cement containing about 50 percent by weight of water and the solids content of the cement consisting essentially of about 50 percent by weight of lime, about 20 percent by weight of quartz, about 20 percent by weight of clay, and about 10 percent by weight of organic additive for retarding setting time.

3. A cement consisting essentially of water, lime, quartz, clay, and an organic additive for retarding setting time, the cement containing between about 47 and 53 percent by weight of water, and the solids content consisting essentially of between about 40 and 60 percent by weight of lime, between about 15 and 25 percent by weight of quartz, between about 15 and 25 percent by weight of clay, and between about 8 and 12 percent by weight of organic additive for retarding setting time.

4. A cement consisting essentially of water, lime, quartz, clay, and an organic additive for retarding setting time, the cement containing about 50 percent by weight of water, and the solids content consisting essentially of about 50 percent by weight of lime, about 20 percent by weight of quartz, about 20 percent by weight of clay, and about 10 percent by weight of organic additive for retarding setting time.

5. A method of cementing a well comprising pumping into said well cement consisting essentially of water, lime, quartz, clay, and additive for retarding setting time, the cement containing between about 47 and 53 percent by weight of water and the solids content of the cement consisting essentially of between about 40 and 60 percent by weight of lime, between about 15 and 25 percent by weight of quartz, between about 15 and 25 percent by weight of clay, and between about 8 and 12 percent by weight of additive for retarding setting time.

6. A method of cementing a well comprising pumping into said well cement consisting essentially of water, lime, quartz having a particle size such that it will pass through a 160 mesh screen of the U. S. Sieve Series, clay, and additive for retarding setting time, the cement containing between about 47 and 53 percent by weight of water and the solids content of the cement consisting essentially of between about 40 and 60 percent by weight of lime, between about 15 and 25 percent by weight of quartz, between about 15 and 25 percent by weight of clay, and between about 8 and 12 percent by weight of additive for retarding setting time.

7. A method of cementing a well comprising pumping into said well cement consisting essentially of water, uncombined lime, uncombined quartz, uncombined clay, and additive for retarding setting time, the cement containing between about 47 and 53 percent by weight of water and the solids content of the cement consisting essentially of between about 40 and 60 percent by weight of lime, between about 15 and 25 percent by weight of quartz, between about 15 and 25 percent by weight of clay, and between about 8 and 12 percent by weight of additive for retarding setting time.

8. A cement consisting essentially of water, lime, quartz, clay, and additive for retarding setting time, the cement containing between about 47 and 53 percent by weight of water and the solids content of the cement consisting essentially of between about 40 and 60 percent by weight of lime, between about 15 and 25 percent by weight of quartz, between about 15 and 25 percent by weight of clay, and between about 8 and 12 percent by weight of additive for retarding setting time.

9. A cement consisting essentially of water, lime, quartz having a particle size such that it will pass through a 160 mesh screen of the U. S. Sieve Series, clay, and additive for retarding setting time, the cement containing between about 47 and 53 percent by weight of water and the solids content of the cement consisting essentially of between about 40 and 60 percent by weight of lime, between about 15 and 25 percent by weight of quartz, between about 15 and 25 percent by weight of clay, and between about 8 and 12 percent by weight of additive for retarding setting time.

10. A cement consisting essentially of water, uncombined lime, uncombined quartz, uncombined clay, and additive for retarding setting time, the cement containing between about 47 and 53 percent by weight of water and the solids content of the cement consisting essentially of between about 40 and 60 percent by weight of lime, between about 15 and 25 percent by weight of quartz, between about 15 and 25 percent by weight of clay, and between about 8 and 12 percent by weight of additive for retarding setting time.

References Cited in the file of this patent
UNITED STATES PATENTS

| | | |
|---|---|---|
| 122,880 | Dean | Jan. 23, 1872 |
| 377,036 | Lichtentag | Jan. 31, 1888 |
| 720,799 | Hanmore | Feb. 17, 1903 |
| 1,424,908 | Isaacs | Aug. 8, 1922 |
| 1,635,212 | Herrly | July 12, 1927 |
| 2,285,302 | Patterson | June 2, 1942 |
| 2,320,010 | Ralston et al. | May 25, 1943 |
| 2,353,822 | Gardner | July 18, 1944 |
| 2,404,038 | Cardwell | July 16, 1946 |
| 2,469,379 | Fraser | May 10, 1949 |
| 2,491,487 | Taulwetter | Dec. 20, 1949 |
| 2,509,599 | Hollenberg | May 30, 1950 |
| 2,562,148 | Lea | July 24, 1951 |
| 2,671,030 | Gobel et al. | Mar. 2, 1954 |
| 2,793,957 | Mangold et al. | May 28, 1957 |

OTHER REFERENCES

Lea and Desch, "The Chemistry of Cement and Concrete," London, Edward Arnold and Co., 1935, page 17.